Dec. 4, 1956     T. PFEFFER     2,772,806

PRESSURE COOKER

Filed Jan. 21, 1954

INVENTOR.
Theophil Pfeffer
BY
Young, Emery & Thompson
Attys.

United States Patent Office 2,772,806
Patented Dec. 4, 1956

2,772,806

PRESSURE COOKER

Theophil Pfeffer, Esslingen (Neckar), Germany, assignor to Heinrich Ritter Aluminiumwarenfabrik, Esslingen (Neckar), Germany Application January 21, 1954, Serial No. 405,340

Claims priority, application Germany January 21, 1953

7 Claims. (Cl. 220—44)

The present invention relates to pressure cookers, and it resides in certain improvements, features of construction and combinations and arrangements of parts, all of which will be fully set forth herein and particularly pointed out in the claims.

The problem generally arising in the manufacture and use of the so-called pressure cookers or steam cookers, that is, cooking pots which, except for a control or safety valve, are tightly sealed during the cooking process so as to produce a relatively high steam pressure therein, is to obtain a cover for such vessel which can be secured thereto tightly as well as safely by a very simple manipulation. The designs previously used generally had the disadvantage that, if safe, their construction and operation was too complicated and cumbersome to be practicable, often requiring a knowledge and dexterity severely taxing those of an untrained person, or that, if simple, either their safety features were neglected, endangering the user, or their sealing elements were easily damaged or soon worn out, so that the required pressure could no more be adequately produced and maintained in such vessel.

Devices of this kind usually consisted of a hoop or the like which was hooked either under the projecting upper edge of the pot or under the pot handles and provided with some sort of a tension spring acting upon the cover. Other devices consisted of a number of clamps for bolting the cover to the pot. The more simple variety of devices, as described above, usually provide a bayonet lock to secure the cover to the pot.

It is the object of the present invention to provide a pressure cooker which avoids the above mentioned disadvantages of the prior art, and is of simple construction and long life, easily manipulated, and secure in operation.

A distinguishing feature of the invention is that the clamping springs, usually provided on the outside, and therefore cumbersome and unsightly, are hidden and safely enclosed within the edge portion of the cover which is overlapping and downwardly projecting from the upper edge of the pot itself.

Another feature of the invention is that, by a mere twist of the pot handles which are mounted on the cover, these springs will first be moved radially inward so as to come under the projecting edge of the pot, and will then, by a further twist of the handles, be pressed against the edge of the pot, or, in unlocking, that they are first drawn downwardly away from the edge of the pot and then moved in radial direction outwardly and out of reach of the pot edge. Thus, it is much easier for the housewife to open or close the pressure cooker since she need not look for a separate and easily misplaced hoop or similar device, as used in previous designs, and then place and center the same on the cover, but only has to place the self-centering cover according to the invention on the pot and then simply twist the two handles to tighten them and thereby lock the pot securely.

These as well as other objects, features, and advantages of the present invention will be described below in detail and shown in the accompanying drawings, in which Fig. 1 shows a side view of a pressure cooker according to the invention, parts thereof being broken away for better illustration;

Fig. 8 is a view of the tension spring when released from the edge of the pot, similarly as shown in Fig. 5; while

Figure 4:
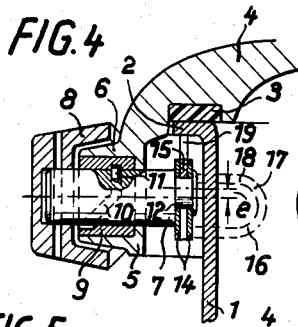
Fig. 4 shows a partial section similar to Fig. 2, but in an enlarged scale, with the tension spring in the locking position.
Figure 7:
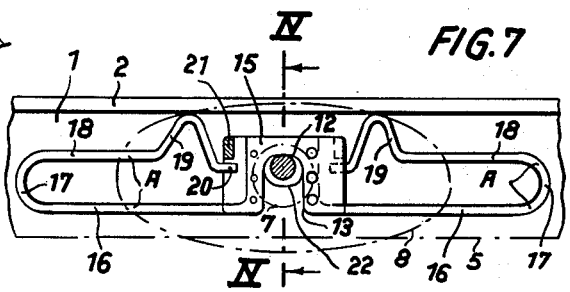
Fig. 7 is a view of the tension spring in the locking position, similarly as shown in Fig. 4.
Figure 5:
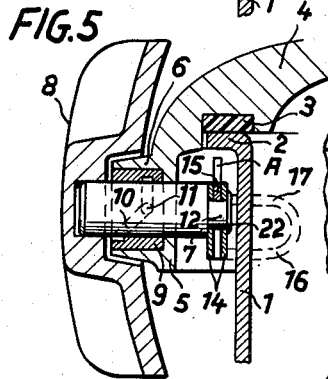
Fig. 5 shows a similar section taken along line V—V of Fig. 8, with the handle turned 90°.
Figure 8:
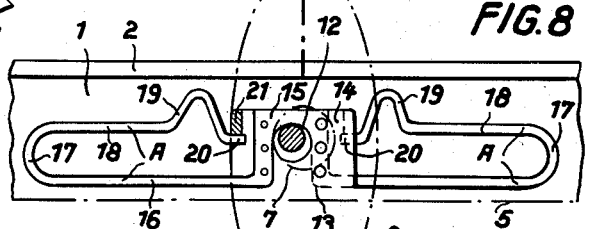

Referring to the drawings, the pot 1 of the pressure cooker, which is preferably made of light metal, has an upper edge 2 which projects outwardly in the form of a small flange and forms the supporting surface for a sealing ring or gasket 3 which is fitted into an annular groove of the cover 4. The edge 5 of the cover projects beyond and below the edge 2 of the pot 1 and is provided at two diametrically opposed points with projections 6 forming the bearings for the stud axles 7 of two turning handles 8. As shown especially in Figs. 4 to 6, each bearing projection 6 contains a bushing 9 which at its inside is provided with a guide slot 10 for holding a guide pin 11 secured in the stud 7 and projecting radially therefrom. In the particular embodiment of the invention as shown in the drawings, the guide slot 10, within a turn of 90°, extends annularly within a vertical plane relative to the axis of rotation of the stud 7. Along a further turn of 90°, it forms a steep spiral groove which terminates at the handle side of the bushing 9. By such a shape of the guide slot 10 it is made possible that the handle studs 7 during a 90° turn from the closing position (see Fig. 4) are only turned (see Fig. 5) and that during a further 90° turn they are also shifted outwardly in their axial direction (see Fig. 6). As shown especially in Figs. 7 and 8, the inner end of the stud 7 of each turning handle carries an eccentric 12 with a degree of eccentricity e, on which a thin saddlelike casing 14 with an opening in downward direction is placed. This casing consists of two face plates between which the central portion 15 of a tension spring A is secured by riveting. Outwardly projecting from the central portion 15 of the tension spring A toward each side thereof is a lower horizontal arm 16 which, at its outer end 17, is bent back like a hair pin and continues inwardly in the form of an arm 18 and extends into an upwardly projecting portion 19 for transmitting the pressure of the spring A to the underside of the rim 2 of the pot 1. The free end 20 of each of the two upper spring arms 18, which extends horizontally inward, projects into the casing 14 and there engages below a stop 21 which prevents the spring from being released entirely, and retaining a certain amount of tension therein when loosened from the edge 2 of the pot 1, as shown in Figs. 5 and 8. As may be seen in Figs. 4 to 6 and 9, the outer ends 17 of the spring A rest under tension on the inside of the edge 5 of the cover which hides them completely from the outside. A suitable head 22 at the inner end of the eccentric 12 retains the casing 14 securely thereon.

Figure 1:
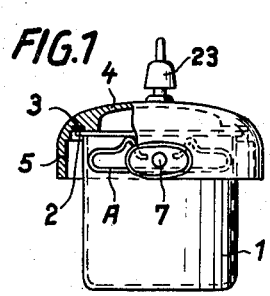
Figure 2:
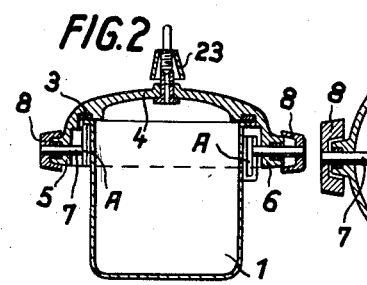
Fig. 2 shows a vertical central cross section through the pressure cooker taken in a plane passing through the axis of the turning handles.
Figure 3:
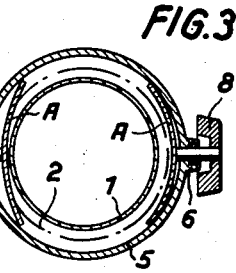
Fig. 3 shows a horizontal section taken in a plane passing through the axis of the turning handles.
Figure 6:
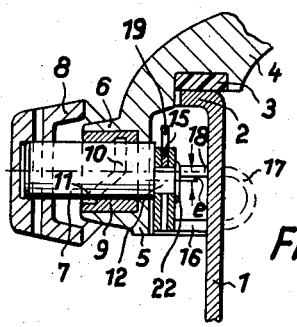
Fig. 6 shows a similar section with the handle turned 180°.

The operation and manipulation of the new pressure cooker is as follows:

When the housewife wants to place the cover 4 on the pot 1, the two handles 8 should be turned so that the eccentric 12 is in its lowest position, as shown in Fig. 6. The studs 7 of the handles are thereby moved radially outward, as seen from the center of the pot, so that the springs A lie outside the projecting edge 2 of the pot 1, as seen in Fig. 6 and by the dot and dash lines indicating the spring in Fig. 9. The cover 4 may now be placed easily on the pot 1 or be removed therefrom. After placing the cover on the pot, the two handles 8 are twisted in a clockwise direction whereby, during the first 90° turn, the guide pins 11 running in the guide slots 10 move the two handle studs 7 in axial direction inwardly until the spring A lies underneath and radially inward of the vertical plane of the projecting edge 2 of the pot, as illustrated in Fig. 5 and by the position of the spring A shown in Fig. 9 in full lines. However, at this time, the eccentrics 12 have not as yet raised the springs A to such an extent that the crest of their two upward projections 19 will touch the underside of the edge 2 of the pot 1, as shown in Fig. 8, but the inner free ends 20 of the spring arms 18 rest under the normal tension of the spring against the stops 21 of the spring casing 14. When the handles 8 are then turned another 90°, the eccentrics 12 raise the spring casing 14 to such an extent that the projections 19 of the springs A are forced against the underside of the projecting edge 2 of the pot 1, as shown in Figs. 4 and 7. When the handles 8 are turned to this position, the cover 4 with the gasket 3 therein is thus drawn tightly against the upper edge 2 of the pot to seal the latter tightly and securely. If in cooking the steam pressure within the pot should become excessive, it will either force the cover upwardly against the action of the springs A, thus permitting the excess steam to escape downwardly through the downwardly projecting edge 5 of the cover 4, or a safety valve 23 may be provided in the cover 4, as illustrated in Figs. 1 and 2.

If at the end of the cooking process the pot should be opened, the operation as described above proceeds in the reverse order. The handles 8 are then turned counterclockwise so that during the first 90° turn, the springs A are released and withdrawn downwardly from the edge 2 of the pot, as shown in Figs. 5 and 8. The cover may then, however, not as yet be lifted from the pot 1 since the springs A still engage underneath the pot edge 2. However, when in this position, the steam can escape completely from the pot since, although still securely retained on the pot 1, the cover only rests thereon with its own weight without being tightened by the springs A. Thus, the danger of an accident, often arising in pressure cookers of other design by an attempt to remove the cover from the pot before the pressure has been released therefrom, is completely avoided.

Figure 9:
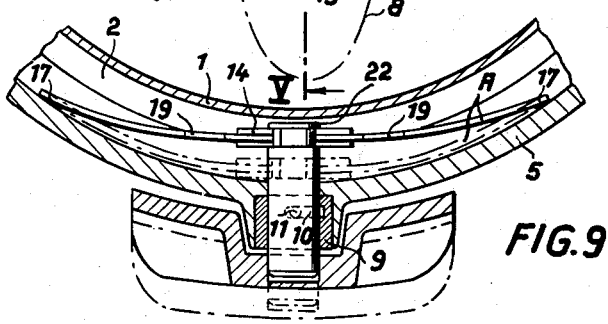
Fig. 9 shows a horizontal cross section, seen from below, and taken within the axial plane of the two turning handles, the locking position of the tension spring being shown in full lines and the open or released position thereof in dot and dash lines.

After releasing the steam pressure, the handles are turned another 90° whereby the springs are further lowered and simultaneously drawn outwardly, so as to lie outside of the periphery of the edge 2 of the pot (see Fig. 6 and the dotted line position in Fig. 9). Thus, not until this time is it possible to lift the cover freely from the pot 1. For cleaning purposes, the springs may be easily removed from, and reinserted into, the cover inasmuch as their casings 14 have sufficient radial and axial play on the eccentrics 12 to permit them to be slightly tilted so that they can then be withdrawn therefrom in upward direction.

While the foregoing description sets forth in detail what I regard as the preferred embodiment of my invention, it is to be understood that numerous changes may be made therein without departing from the spirit and the scope of the invention as defined in the appended claims. For example, instead of letting the springs A with their ends 17 rest directly on the inside of the cover 5, one or more additional springs or rubber bumpers or cushions may be secured thereto to produce the actual contact and, at the same time, to insure the horizontal position of the springs A within the cover.

Having thus described my invention, what I claim as new is:

1. A cooking vessel comprising in combination a pot and a cover therefor, said pot and said cover each having surfaces adapted to contact each other, a projection on the outer wall of said pot, a portion on said cover extending outwardly beyond and downwardly below said projection, locking means adapted to act upon the lower surface of said projection and including a shaft rotatably mounted on said cover portion, a guide slot and pin for said shaft and said cover portion whereby said shaft moves axially upon rotation of the shaft, and a spring element and means mounted on the inner end of said shaft, so that when rotating said shaft, said spring element is first moved in a substantially horizontal direction toward the outer wall of said pot and below said projection, and then in an upward direction against the lower surface of said projection so as to lock said cover onto said pot.

2. A cooking vessel comprising in combination a pot and a cover therefor, said pot and said cover each having a surface adapted to contact each other, a projection on the outer wall of said pot, a portion on said cover extending outwardly beyond and downwardly below said projection, locking means adapted to act upon the lower surface of said projection and including a shaft rotatably mounted on said cover portion, a guide slot and pin for said shaft and said cover portion whereby said shaft moves axially upon rotation of the shaft, an eccentric on the inner end of said shaft, and a spring element mounted on said eccentric, said shaft and said eccentric thereon being rotatable relative to said spring element, so that when rotating said shaft, said spring element, without rotary movement thereof, is first moved in a substantially horizontal direction toward the outer wall of said pot and below said projection, and then in an upward direction against the lower surface of said projection so as to lock said cover resiliently onto said pot.

3. A cooking vessel comprising in combination a pot having an outwardly extending flange along its upper edge, a hollow cover adapted to fit over the upper end of said pot, a shaft rotatably mounted within the side wall of said cover, a handle at the outer end of said shaft, locking means at the inner end of said shaft, cam slot and pin means on said shaft and said side wall for translating the rotary movement of said shaft into a movement in axial direction thereof, whereby when said handle is turned, said locking means are first moved toward the outer wall of said pot and underneath the flange thereof, and then against the lower surface of said flange so as to lock said cover on said pot.

4. A cooking vessel comprising in combination a pot having an outwardly extending flange along its upper edge, a hollow cover adapted to fit over the upper end of said pot, a shaft rotatably mounted within the side wall of said cover, a handle at the outer end of said shaft, locking means at the inner end of said shaft and including resilient means, cooperating cam slot and pin elements on said shaft and said side wall for translating the rotary movement of said shaft into a movement in axial direction thereof, whereby when said handle is turned, said resilient means are first moved toward the outer wall of said pot and underneath the flange thereof, and then upwardly and against the lower surface of said flange so as to lock said cover resiliently on said pot.

5. A cooking vessel comprising in combination a pot having an outwardly extending flange along its upper edge, a hollow cover adapted to fit over the upper end of said pot, a shaft rotatably mounted within the side wall of said cover, a handle at the outer end of said shaft, and an eccentric at the inner end thereof, locking means including at least one spring mounted on said eccentric, said shaft and eccentric being rotatable relative to said spring, cooperating cam slot and pin elements on said shaft and said side wall for translating the rotary movement of said shaft and eccentric into a movement in axial direction of said shaft, so that when turning said handle, said spring, without rotary movement thereof, is first moved in a substantially horizontal direction toward the outer wall of said pot and underneath said flange, and then upwardly in a substantially vertical direction against the lower surface of said flange so as to lock said cover securely and resiliently on said pot.

6. A cooking vessel comprising in combination a pot of substantially circular cross section having an outwardly extending annular flange along its upper edge, a hollow cover adapted to fit upon said flange when said cover is in a closed position on said pot, a pair of shafts rotatably mounted at diametrically opposed points within the side wall of said cover, a handle at the outer end of each of said shafts, and an eccentric at the inner end of each of said shafts, locking means including at least one spring mounted on each of said eccentrics, said shafts and eccentrics thereon being rotatable relative to said springs, cooperating cam elements on each of said shafts and said side wall for translating the rotary movement of said shafts and eccentrics into a movement in axial direction of said shafts, so that when turning said handles, said springs, without rotary movement thereof, are first moved in a substantially horizontal direction toward the outer wall of said pot at diametrically opposed points thereof and underneath said flange, and then upwardly in a substantially vertical direction against the lower surface of said flange so as to lock said cover securely and resiliently at opposite points on said pot.

7. A cooking vessel comprising in combination a pot having an outwardly extending flange along its upper edge, a hollow cover adapted to fit upon said flange when said cover is in a closed position on said pot, a pair of shafts rotatably mounted at diametrically opposed points within the side wall of said cover, a handle at the outer end of each of said shafts, and an eccentric at the inner end of each of said shafts, resilient locking means mounted on each of said eccentrics, each of said locking means comprising a saddlelike central portion loosely riding on said eccentric and having stop elements thereon, at least one spring element mounted on said central portion and extending in opposite directions therefrom in the form of two relatively long, substantially horizontal arms of hairpinlike shape, the lower part of each arm being secured to said central portion and the unsecured free end of the upper part of each arm resting under initial tension on one of said stop elements, said upper part of each spring arm having an upwardly extending bent portion, and means on each of said eccentrics for retaining said locking means thereon, said shafts and eccentrics thereon being rotatable relative to said springs, cooperating cam elements on each of said shafts and said side wall for translating the rotary movement of said shafts and eccentrics into a movement in axial direction of said shafts, whereby when turning said handles, said springs, without rotary movement thereof, are first moved in a substantially horizontal inward direction toward the outer wall of said pot at diametrically opposed points thereof and underneath said flange, and then upwardly in a substantially vertical direction until the upwardly bent portions of said springs press tightly against the lower surface of said flange so as to lock said cover securely and resiliently at opposite points on said pot.

References Cited in the file of this patent

FOREIGN PATENTS

| | | |
|---|---|---|
| 140,213 | Great Britain | Mar. 25, 1920 |
| 207,364 | Great Britain | Nov. 29, 1923 |
| 193,888 | Switzerland | Mar. 1, 1938 |